UNITED STATES PATENT OFFICE.

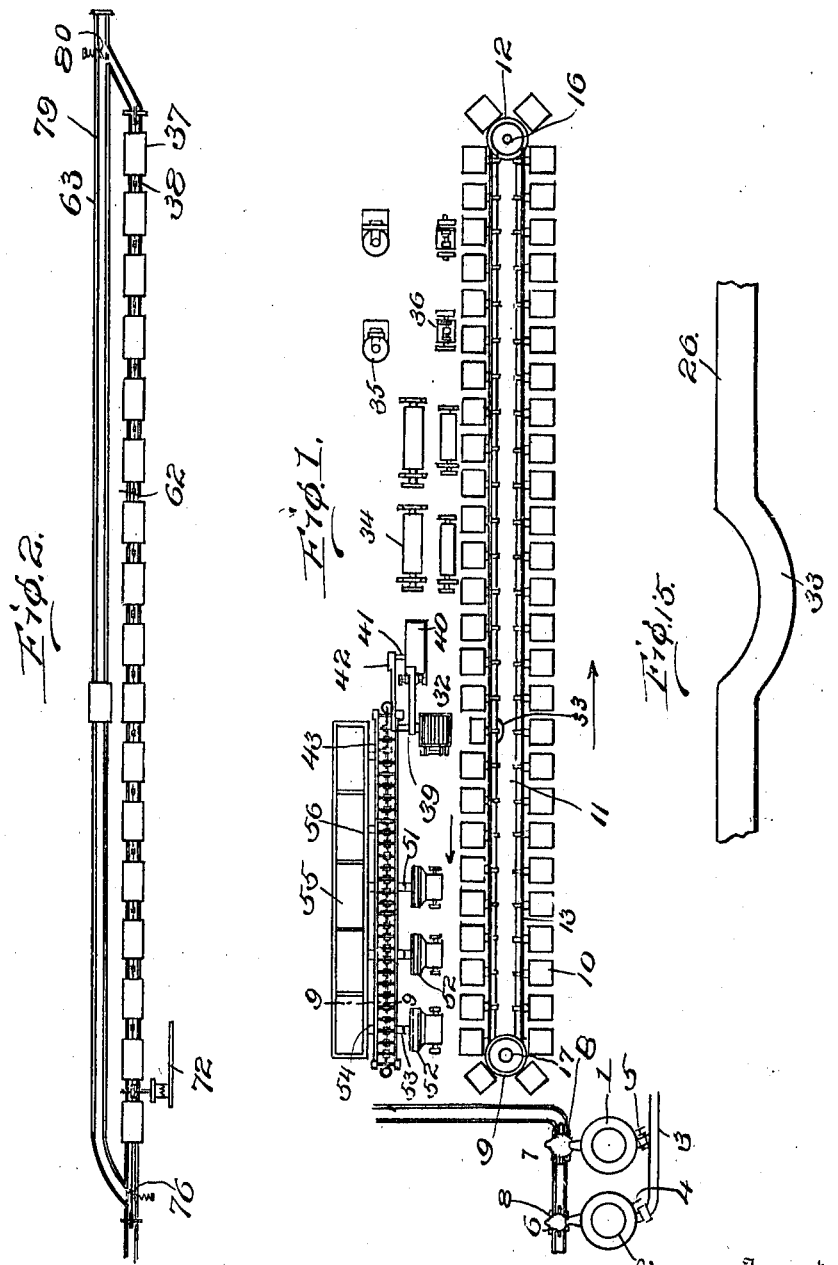

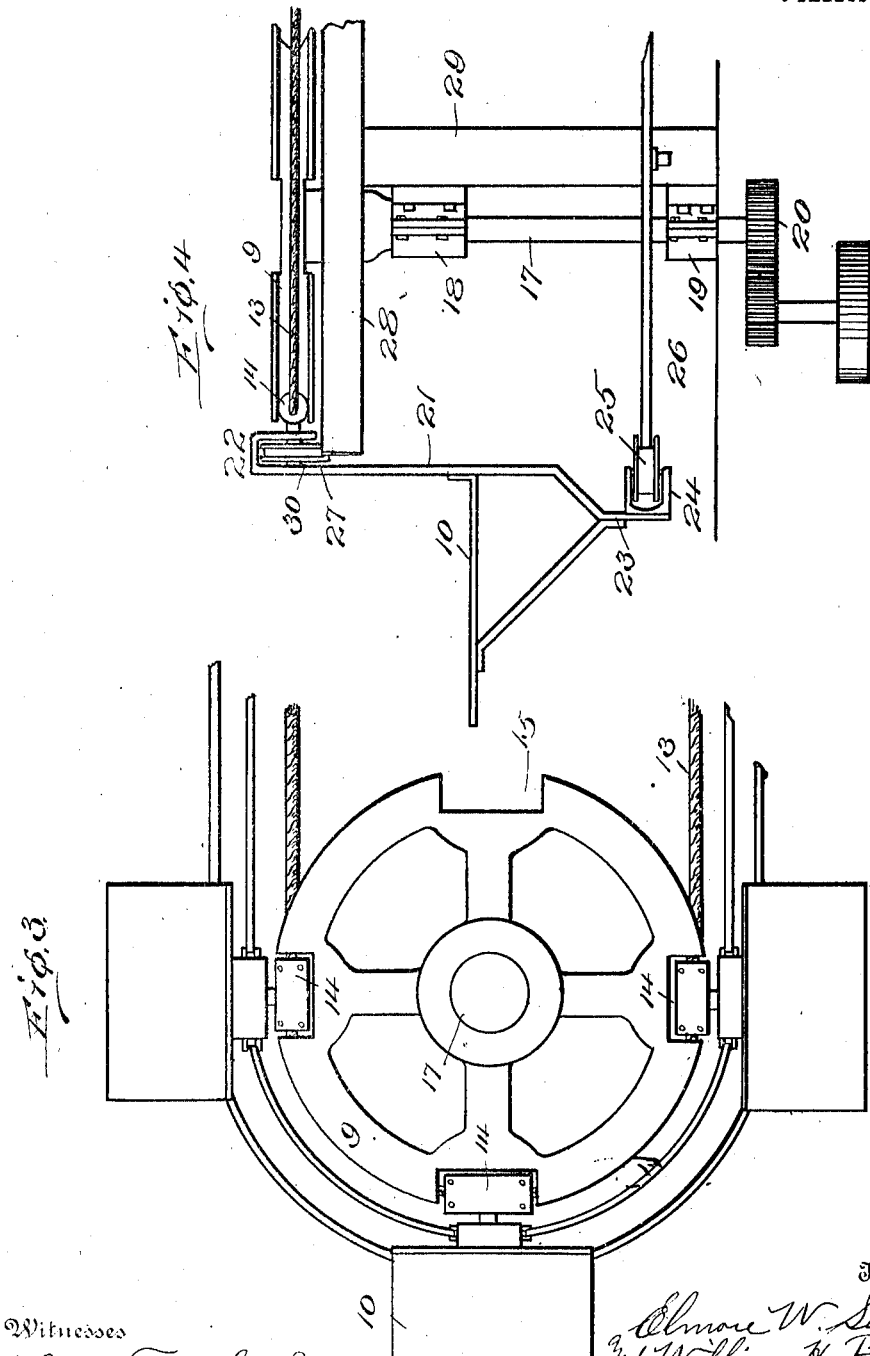

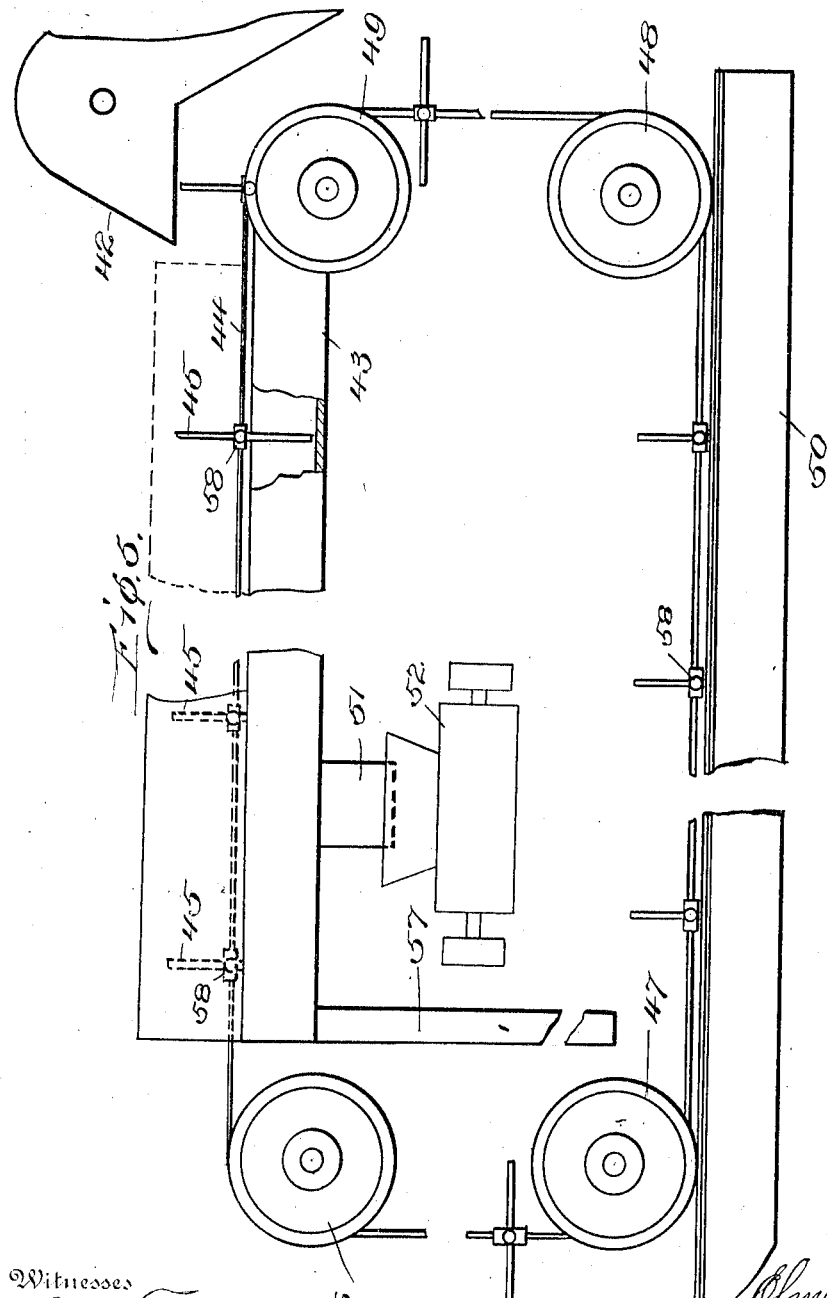

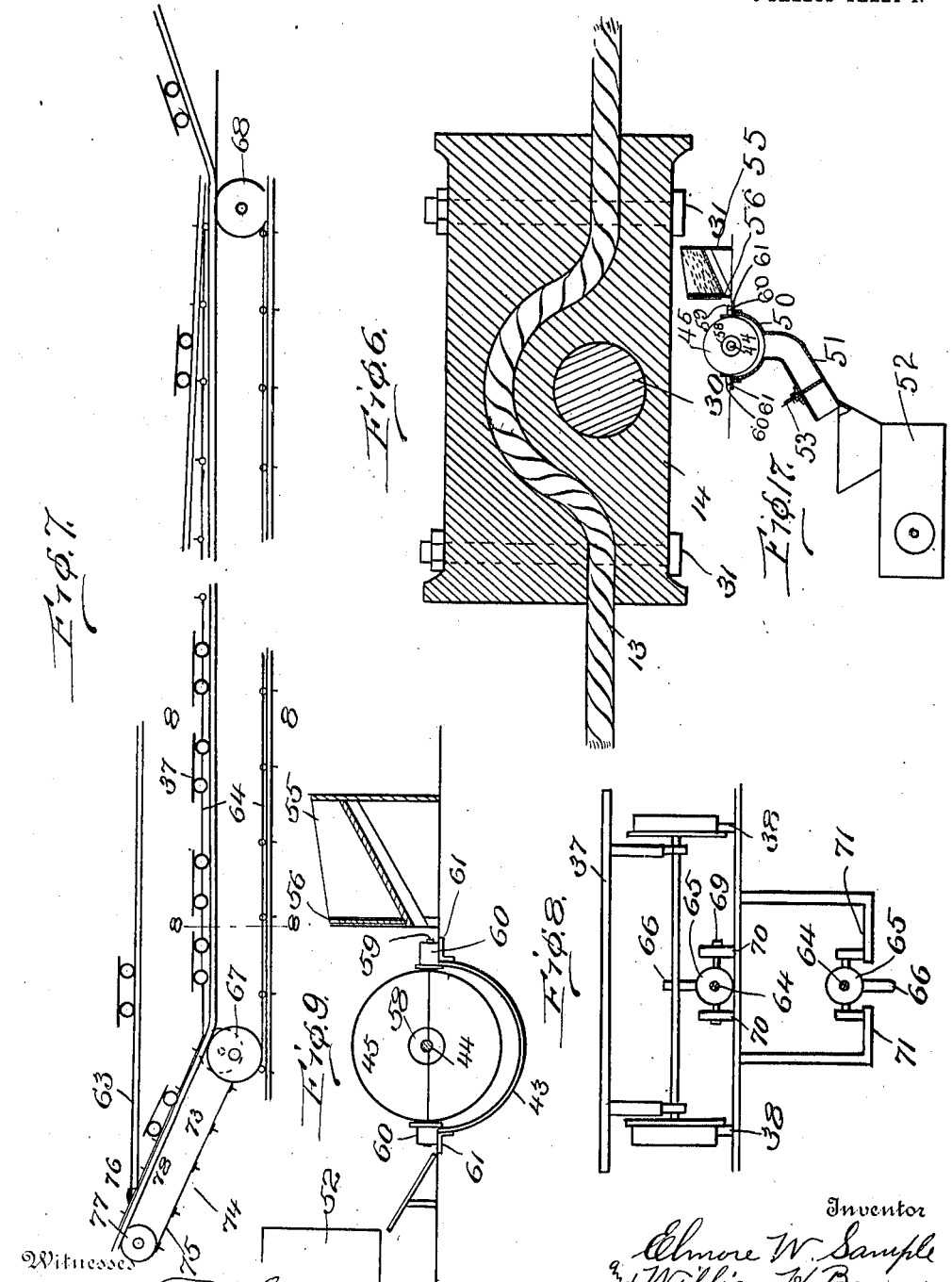

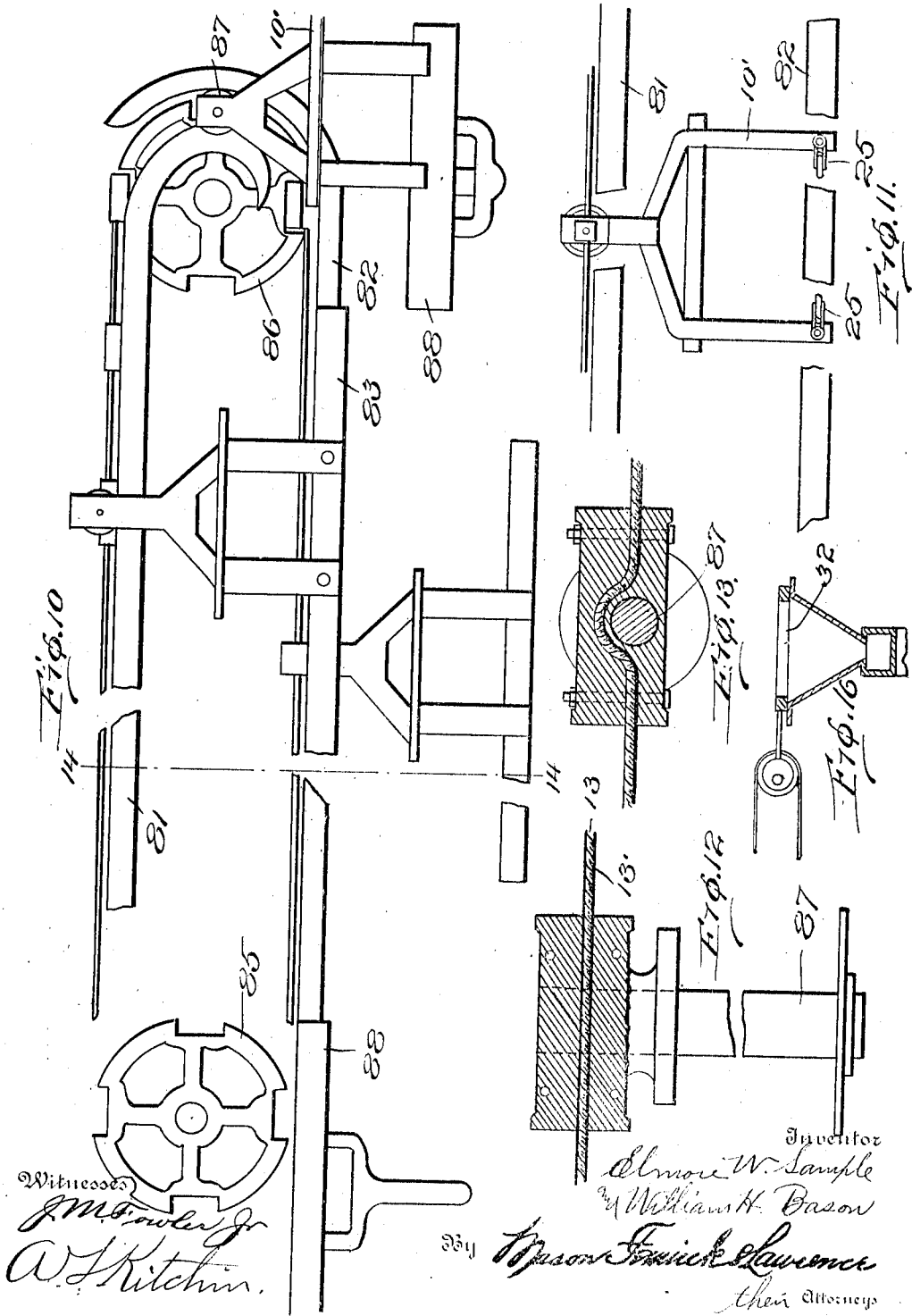

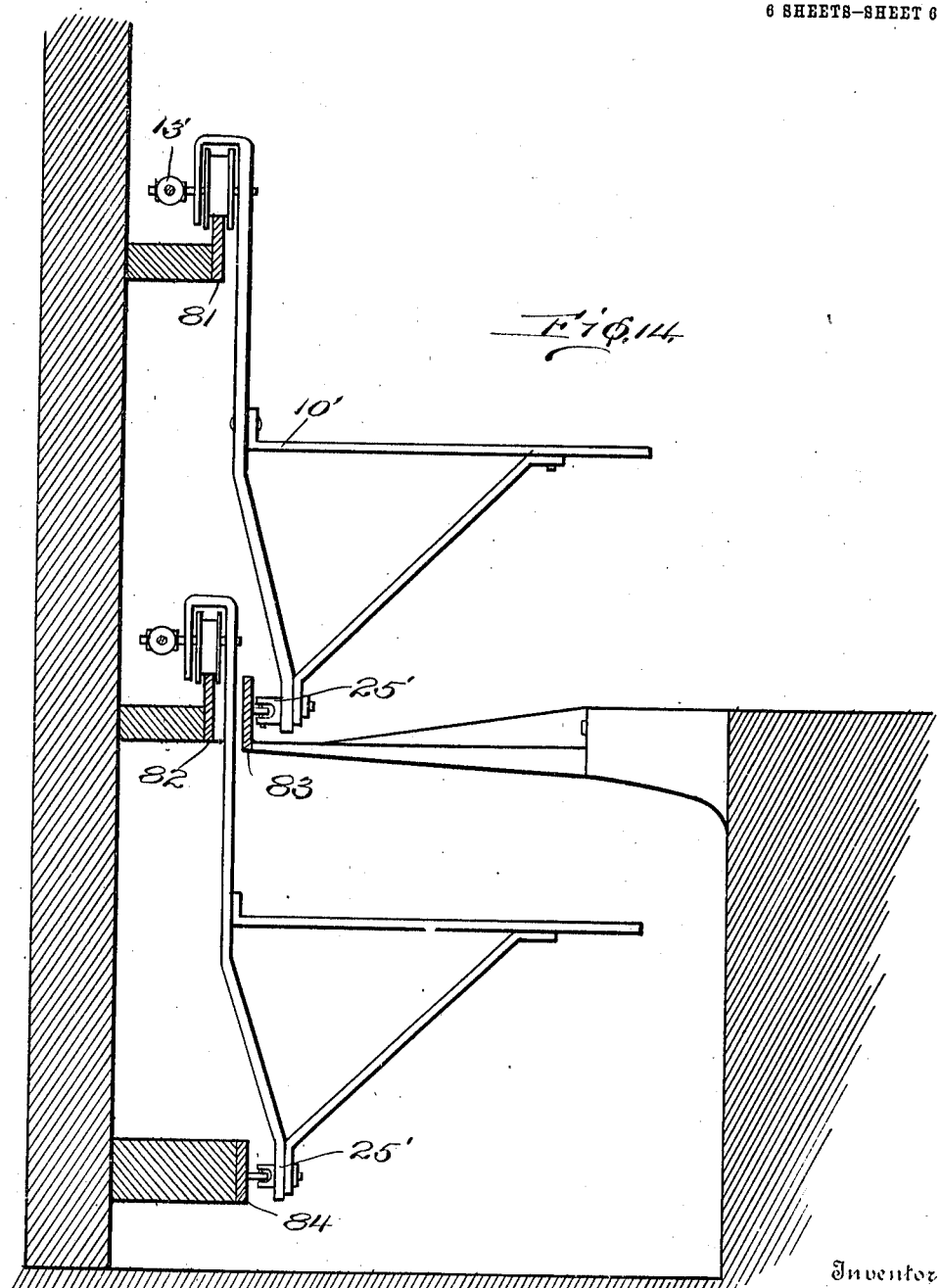

ELMORE W. SAMPLE AND WILLIAM H. BASON, OF BIRMINGHAM, ALABAMA.

APPARATUS FOR FORMING CASTINGS.

1,031,202.  Specification of Letters Patent.  Patented July 2, 1912.

Application filed November 3, 1909. Serial No. 526,138.

*To all whom it may concern:*

Be it known that we, ELMORE W. SAMPLE and WILLIAM H. BASON, citizens of the United States, residing at Birmingham, in the county of Jefferson and State of Alabama, have invented certain new and useful Improvements in Apparatus for Forming Castings; and we do hereby declare the following to be a full, clear, and exact description of the invention, such as will enable others skilled in the art to which it appertains to make and use the same.

This invention relates to improvements in associated apparatus and arrangement of means for casting metal and distributing the same to a predetermined point.

The object in view generically is the arrangement of means for casting and conveying metal ware.

Another object in view is the arrangement of means for conveying flasks or molds, associated with means for pouring the same, manufacturing the flasks, tumbling and finishing the ware molded in the flasks, and transporting means for conveying the finished ware to a desired point.

With these and other objects in view the invention comprises certain novel constructions, combinations, and arrangement of parts as will be hereinafter more fully described and claimed.

In the accompanying drawings: Figure 1 shows an arrangement of flask conveying means and associated apparatus, all embodying certain features of the invention. Fig. 2 is a plan view of a system of conveying means for conveying articles from the conveyer shown in Fig. 1. Fig. 3 is an enlarged fragmentary top plan view of the conveyer shown in Fig. 1. Fig. 4 is a side elevation of the structure shown in Fig. 3. Fig. 5 is an enlarged view of sand carrying mechanism, the same being broken away to better disclose the structure. Fig. 6 is an enlarged detail sectional view through one of the rope clamps used in securing the carrier arm shown in Fig. 3 to its operating cable. Fig. 7 is a diagrammatic edge view of the conveyer shown in Fig. 2. Fig. 8 is an enlarged detail sectional view approximately on line 8—8 of Fig. 7. Fig. 9 is an enlarged detail sectional view approximately on line 9—9 of Fig. 1. Fig. 10 is a side elevation of a slightly modified form of conveyer to that shown in Fig. 3. Fig. 11 is an enlarged detail fragmentary view of one of the flask carrying arms shown in Fig. 10, the same being broken away for illustrating the structure thereof. Fig. 12 is a sectional view of
the clamp and journal member for connecting the flask carrying arm shown in Fig. 11 to its operating cable. Fig. 13 is a section through Fig. 12, approximately on line 13—13. Fig. 14 is an enlarged fragmentary sectional view through Fig. 10, approximately on line 14—14. Fig. 15 is a detail fragmentary view of the means formed in the guiding track for dumping the flasks. Fig. 16 is a fragmentary sectional view through the shake-out. Fig. 17 is a transverse section through one of the sand distributing troughs and associated parts.

In constructing means embodying the invention the various parts or structures thereof are designed to be arranged for accomplishing a single purpose or end, though a plurality of distinct structures are used, but arranged in interdependent sequence, so that each succeeding structure depends for its most successful operation upon the one immediately preceding. A conveyer is provided of any desired size and length used for conveying flasks or molds to means for pouring metal therein, which means is arranged to continuously supply the molten metal to the flasks as fast as the conveyer moves the same in proximity to the pouring device. After the molds have been filled the conveyer moves the same away and at the same time a fresh or unfilled mold is moved beneath the pouring device. As the filled molds or flasks are moved away the same are cooled gradually until the molten metal therein has congealed. The conveyer continues to move the flasks even after the molten metal therein has congealed for a short distance, and then automatically dumps the flasks and metal contained therein onto an automatic shake-out device for separating the metal casting from the sand of the mold. The metal casting is designed to be moved by the shake-out to one side, and the sand is designed to be caught in a hopper and transported to molding machines for molding the flasks. The metal casting that has been automatically moved to one side by the shake-out device is manually placed in a "tumbler" from which it is passed to finishing mechanism of any desired kind. From the finishing mechanism the casting is placed upon conveying cars which eventually transport and deposit the casting at a warehouse or other desired point. The sand disposed of by the automatic shake-out device is moved by suitable means to molding machines, together with additional sand if desired for making new flasks which are manually placed upon the conveyer preparatory to being brought beneath the metal pouring device. By thus associating various means the metal is continuously and successively operated upon from the time it is put in the cupola or melting device until it is finally discharged in the warehouse a finished product.

In order that the invention may be more clearly understood an embodiment of the same is shown in the accompanying drawings in which 1 and 2 indicate cupolas or melting devices fed by suitable means as pipes 3. Valves 4 and 5 are provided for regulating the amount of material placed in the cupolas. Adjacent the melting means or cupolas 1 and 2 is a track 6 carrying a truck 7 of any desired structure upon which is mounted a suitable ladle 8, or pouring device, which is designed to be filled with metal from one of the cupolas 1 or 2, and then moved around in proximity to wheel 9 for pouring into flasks placed upon the supporting arms 10 when the same come opposite. The ladle 8 may be of any desired structure. A plurality of ladles 8 may be provided if desired, and are suitably mounted upon trucks so as to be freely movable along track 6 as desired.

The conveyer 11 is provided with a wheel 9 at one end, and a similar wheel 12 at the opposite end constructed, as more clearly shown in Fig. 3, for accommodating a cable 13, and also accommodating the cable clamps 14. In order to accommodate the clamps 14 a plurality of notches 15 are formed in wheels 9 and 12, and spaced apart properly for receiving the respective member 14 so that the wheels act in a certain sense as a sprocket wheel and the cable 13 and clamp 14 act in a certain sense as a chain. Wheel 12 is mounted upon shaft 16, which in turn is mounted in suitable bearings of any desired kind, and wheel 9 is secured to a shaft 17 mounted in bearings 18 and 19 and is connected with a gear wheel 20 which receives power from any suitable source, (not shown), whereby the conveyer is moved as desired for causing the respective flask carrying arms 10 to come opposite the ladle 8.

The flask carrying arms 10 (Fig. 4) are each formed with an upright member 21 which is bent over into a hook-shaped member 22 at the top and is arranged with an offset portion 23 at the bottom for receiving a bracket 24. Bracket 24 carries a grooved wheel 25 which travels upon a track 26 and supports arm 10 with the assistance of wheel 27 journaled in the hook member 22. Grooved wheel 27 is designed to travel upon track 28, which track is supported by suitable standards 29, which standards also support track 26. The journal 30 of wheel 27 is rigidly secured to one part of the rope clamp 14 (Fig. 6) so as to positively travel therewith. The rope clamp 14 is made in two parts and secured together by suitable bolts 31. The part which carries the bearing shaft 30 has a raised portion centrally thereof, and the opposite part of course has a groove centrally thereof for accommodating the raised portion. A longitudinal groove is formed in each part of the clamp 14 for accommodating cable 13 when the parts are clamped together by bolts 31. The clamp 14 may be made cylindrical or rectangular as desired, and of a sufficient length for fitting into the notches or cut out portions 15 of wheels 9 and 12.

The ladle 8 is designed to pour metal into the flasks on arms 10 when the same come opposite wheel 9, as shown in Fig. 3, and from thence the filled flasks are conveyed to wheel 12, around wheel 12, and back toward wheel 9 until the same reach a position opposite an automatic shake-out 32. At this point the track 26 is bent inward at 33 (Figs. 1 and 15). The wheel 25 will follow the inward bending or curvature of the track, which will necessarily cause the arms 10 to tilt and permit the flask thereon to slide off. After sliding off arm 10 the flask will be caught by the automatic shake-out 32, which is placed in proximity to the curved portion 33 of track 26, and slightly below the same. After the flask has been dumped arm 10 will continue its movement, and will be raised to its ordinary position, whereupon a new flask is placed thereon, which is conveyed to the pouring point, and the flask filled, which is then conveyed around to a point opposite the automatic shake-out 32, as just set forth.

After the flasks have been dumped upon the automatic shake-out 32 the same, by its movement, moves the casting to one side, and breaks up the sand of the mold, which passes downward into a chute below the shake-out and, in fact, forming part thereof. The automatic shake-out comprises a framework having a plurality of rods extending from one side to the other with one side of the frame somewhat higher than the opposite side. This frame is secured to a funnel-shaped chute, and to mechanism which shakes or gyrates the chute and frame. This gyratory or shaking movement causes the flask to be broken up and the casting therein to be moved to the lower side of the shake-out, and there dumped, from which it is removed and placed in tumblers 34. From the tumblers 34 the casting is removed to drilling machines 35, if it is necessary to provide holes therein, and then to finishing machines, as for instance lathes 36. From the lathes 36 the finished casting is moved to car 37 on track 38, (Fig. 2), and from thence moved to a desired point, as for instance a warehouse as will be hereinafter fully described. The sand from the flasks which passes through the automatic shake-out into the chute beneath the same is discharged into an elevator leg 39 which conveys the same to a receptacle 40, which automatically mixes and dampens the same to a proper consistency. From receptacle 40 the sand passes through a pipe 41 to an elevator 42. Elevator 42 conveys the sand upward to a trough 43 (Figs. 1 and 5). The trough 43 is of any desired size, and is provided with a cable 44 carrying a plurality of flights 45 which are disk-shaped. The lower part of the flight is designed to extend into trough 43, but not to touch the bottom thereof. Cable 44 passes around suitable pulleys 46, 47, 48 and 49 which are constructed so as to accommodate the flights 45. Power is applied to pulleys 46 and 48 in any desired manner, as for instance, by securing a pulley to each of the shafts carrying these pulleys, and applying a power belt thereto. The power is applied to these pulleys in order to give a direct pull on the respective flights 45 moving the sand to troughs 43 and 50. Trough 43 (Fig. 1) is provided with a plurality of spouts or chutes 51 for discharging sand into flask making machines 52. A suitable gate 53 is provided in the chutes 51 for regulating the amount of sand passing therethrough. A plurality of chutes 54 provided with suitable controlling valves extend from the bottom of trough 43 to the respective tanks or bins 55, which contain a supply of fresh sand. The tanks or bins 55 are provided with sliding doors or gates 56 (Fig. 9) which regulate the amount of sand discharged from the tanks or bins into the lower trough 50. Trough 43 is provided with a chute 57 at the end opposite the elevator 42 in order to permit the flights 45 to empty the top trough 43 into the bottom trough 50, a suitable valve being provided for closing the chute whenever desired.

The flights 45 are each divided into equal halves, the clamp 58 being a portion of the flight, a recess or groove extending longitudinally of each part of the clamp permits of the clamping of the cable 44, and also the axle 59 which fits in a transverse groove in the flight. The axle 59 carries rollers 60 at each end which rest upon angle iron 61 secured to the respective troughs.

Associated with the conveyer 11 is a track conveyer 62. The track conveyer 62 is provided with a track 38, cars 37 and track 63. Track 38 is designed to extend from near where the castings are finished to a warehouse or storage place, and track 63 is the return track for cars 37. The cars are moved by a cable 64 (Fig. 7). In order to convey power from cable 64 to the respective cars 37 a plurality of spaced clamps 65 are provided with lugs 66 extending therefrom for engaging the respective cars 37, as more clearly seen in Fig. 8, for moving the same along track 38. The cable 64 passes over pulleys 67 and 68 which are constructed for permitting the passage around the same of clamps 65. The shaft upon which pulley 67 is secured is rotated by any desired means for moving the cable. The respective cable clamps 65 are each provided with a shaft or axle 69 for accommodating wheel 70 which engages the floor or a prepared track as desired for properly supporting the cable 68 for causing lugs 66 to engage cars 37. In order to accommodate the return cable a gutter is provided in which are arranged tracks 71 on which the wheels 70 roll. The gutter is made of such a depth as to permit the unobstructed return of lugs 66.

The cable 64 is given an intermittent motion by lever 72 which controls the clutch for throwing on and off power from the shaft carrying pulley 67. This is necessary in order that the cars may stop at the right point for being unloaded. After a car has been unloaded the lever 72 is operated for causing cable 64 to move. This will move the empty car up the incline track 73 a short distance, and at the same time move the loaded cars a short distance forward. After the car has been moved up the incline track 73 a short distance the lug 66 pushing the same will move downward and around pulley 67 but a lug 74 similar to lug 66 but arranged on cable 75 will engage the empty car and move the same past switch 76. After the empty car has been moved by lug 74 past switch 76 the same will pass downward around pulley 77 which is driven by any desired power and which accommodates the cable 75 and the respective lugs 74 and rope clamps 78. An idler is positioned at the opposite end of cable 75 for accommodating the cable so as to hold the cable taut and in proper position for engaging the empty cars as the same start up the incline track 73. The switch 76 is a spring actuated switch, and will permit the cars to pass therethrough, but after a car has passed the switch will automatically close for switching the empty car onto track 63. Track 63 is inclined from switch 76 to a point 79. From point 79 the track 63 is inclined upwardly past switch 80 which is constructed similar to switch 76. The momentum of the empty car will cause the same to move up the incline between point 79 and switch 80, so that the empty cars will freely pass switch 80 and move back by gravity onto track 38. The tracks 38 and 63 may be of any desired length and extend in any desired direction, but must be so arranged as to permit the cars to be loaded at one end of the track and be discharged at the other end, and to then automatically return to the loading point.

In Figs. 10 to 14 inclusive will be seen a slightly modified form of flask or mold carrying conveyer which if desired may take the place of the preferred form of carrier 11 shown in Fig. 1. This conveyer is provided with an upper track 81 and a lower or return track 82. The upper track 81 has associated therewith a guide rail 83 arranged in proximity to the lower track 82 and the lower or return track 82 is provided with a guide rail 84. Track 81 is supported by any suitable supports and extends from pulley wheel 85 to pulley wheel 86. At pulley wheel 86 the upper track 81 is bent into a semicircular hook of less diameter than wheel 86 and at wheel 85 it is similarly constructed so as to freely receive the grooved wheels 87 from the lower track 82, which is formed with a hook-shaped member similar to the upper track, except that the same is struck upon the arc of a circle having a larger diameter than the wheels 85 and 86. The wheels 87 are connected to the flask carrying arms 10′ similar to the way in which the preferred form is shown, and is also associated with an operating cable 13′ which is constructed and operates similar to cable 13. In place of the wheel 25 of the preferred structure a caster 25′ is provided which rolls upon the guiding rolls 83 and 84. The flask carrying arms 10′ are constructed similar to the arms 10 of the preferred structure, but are designed to turn at the ends of the conveyer somewhat different by reason of the fact that the pulley wheels 85 and 86 rotate in a vertical plane, and are driven by any suitable power connected with the shaft upon which pulley wheel 85 is mounted.

The flask is put on the arm at any desired point, and is preferably filled shortly before the arm passes around wheel 86. As the arm 10′ approaches wheel 86 the rope clamp associated therewith will engage one of the notches of the wheel, and firmly support the arm, together with the flask as the shaft or axle 87 is rigidly secured to the rope clamp, and passes loosely through the upper part of arm 10′. As the wheel 86 rotates the arm will be gradually lowered as shown in Fig. 10. In order to prevent any tilting or tipping of the arm 10′ a section or short length portion 88 of rail 83 is lowered until the same comes into alinement with rail 84. By the time that the section 88 of rail 83 comes into alinement with rail 84 and forms a continuation thereof the arm 10′ has been lowered and the wheel 87 thereof is resting on the lower track 82. As the wheel 87 moves along track 82 caster 25′ will move off of section 88 onto rail 84 without any jolt or jar as the same are made to register evenly. The arm 10 will continue its movement until it has approached wheel 85 where the flask is removed manually or where it is automatically dumped by a recess in rail 84 similar to recess 33 shown in the preferred form. The arm 10′ after disposing of the flask will continue its motion and move upward around wheel 85, and from thence repeat the operation. The upward movement of the arms 10′ around wheel 85 is merely the reverse to that around wheel 86 as the section 88′ moves upward with the arm and remains in its upper position in line with track 83 until the arm 10′ has moved toward wheel 86 and the casters 25′ have moved off the section 88 whereupon the section will be lowered ready for the next succeeding arm 10′.

The section 88 of rail 82 and also section 88′ are each operated by any desired means connected with shafts carrying wheels 85 and 86 so as to raise and lower the sections in proper timed relationship to the movement of the pulleys.

What we claim is:

1. In a device for the manufacture of castings, a reservoir for molten metal, a traveling ladle adapted to distribute metal from said reservoir, a conveyer for conveying flasks in proximity to said ladle for being filled thereby and then transporting the filled ladle to a discharge point, a track for guiding said conveyer bent out of the line of its general direction at the discharge point for tilting said conveyer at said point whereby each of the flasks upon reaching said point will be automatically dumped from the conveyer.

2. In an apparatus for the manufacture of castings, a reservoir, a ladle for distributing metal from said reservoir, a conveyer for conveying flasks in proximity to said ladle for being filled thereby, said conveyer comprising a pair of wheels, a cable mounted on said wheels, and flasks supporting arms secured to said cable, and a guide rail for said flask carrying arms formed with a depression for tilting said arms, whereby said flasks are dumped from said conveyer.

3. In an apparatus for forming castings, a conveyer comprising a pair of pulley wheels formed with notches therein, a cable positioned on said pulley wheels, cable gripping members surrounding said cable at intervals and arranged to engage the notches in said wheels, a flask carrying arm connected with each of said cable grips, a guide rail for guiding said carrying arm and formed with a depression for inclining said carrying arm for dumping flasks therefrom, and means for supplying the flasks on said conveyer with metal.

4. In an apparatus for forming castings, a conveyer for moving flasks, said conveyer comprising a pair of spaced pulleys, a cable passing around said pulleys, a flask supporting arm connected with said cable and movable thereby, a bracing rail near the lower end of said arm, and anti-friction means positioned between said arm and said bracing rail, said bracing rail being formed with a bent in portion for causing said arm to be moved at an angle to the plane in which said arm normally travels for causing the flask thereon to be dumped therefrom, and means for supplying the flask on said arm with molten metal.

5. In an apparatus for the manufacture of castings, an automatic flask shake-out for separating the sand of the flask from the casting, a plurality of means for pouring and conveying said flasks to the automatic shake-out, and a conveyer for conveying the castings from said shake-out to a storage point, said conveyer comprising a track, a plurality of cars mounted on said track, an endless cable formed with flights thereon for engaging said cars, means for causing said cable to move intermittently, and an inclined track for returning the cars by gravity to the starting point.

In testimony whereof we affix our signatures in presence of two witnesses.

ELMORE W. SAMPLE.
WILLIAM H. BASON.

Witnesses:
F. M. LOWE,
G. GOODEN.